(12) United States Patent
Huang

(10) Patent No.: US 8,649,129 B2
(45) Date of Patent: Feb. 11, 2014

(54) METHOD AND APPARATUS OF PROVIDING OVER-TEMPERATURE PROTECTION FOR POWER CONVERTERS

(75) Inventor: Wei-Hsuan Huang, Taoyuan (TW)

(73) Assignee: System General Corporation, Sindian, Taipei County (TW)

( * ) Notice: Subject to any disclaimer, the term of this patent is extended or adjusted under 35 U.S.C. 154(b) by 531 days.

(21) Appl. No.: 12/940,320

(22) Filed: Nov. 5, 2010

(65) Prior Publication Data

US 2012/0113551 A1 May 10, 2012

(51) Int. Cl.
*H02H 7/10* (2006.01)

(52) U.S. Cl.
USPC .......................................................... 361/18

(58) Field of Classification Search
None
See application file for complete search history.

(56) References Cited

U.S. PATENT DOCUMENTS

| | | | | |
|---|---|---|---|---|
| 6,018,467 A * | 1/2000 | Majid et al. | | 363/16 |
| 7,782,584 B2 * | 8/2010 | Watanabe | | 361/103 |
| 7,956,585 B2 * | 6/2011 | Chen et al. | | 323/220 |
| 8,118,487 B2 * | 2/2012 | Goh et al. | | 374/185 |
| 2003/0038614 A1 * | 2/2003 | Walters et al. | | 323/282 |
| 2003/0111984 A1 * | 6/2003 | Isham | | 323/271 |
| 2005/0237688 A1 * | 10/2005 | Wong et al. | | 361/93.1 |
| 2007/0249092 A1 * | 10/2007 | Joshi et al. | | 438/107 |
| 2008/0002326 A1 * | 1/2008 | Watanabe | | 361/103 |
| 2010/0033237 A1 * | 2/2010 | Liang et al. | | 327/543 |
| 2011/0148200 A1 * | 6/2011 | Burns et al. | | 307/43 |
| 2011/0298528 A1 * | 12/2011 | Endo et al. | | 327/512 |
| 2012/0088995 A1 * | 4/2012 | Fennell et al. | | 600/345 |
| 2012/0139467 A1 * | 6/2012 | Suzuki | | 318/472 |
| 2012/0161728 A1 * | 6/2012 | Chen et al. | | 323/271 |
| 2012/0229102 A1 * | 9/2012 | Burns et al. | | 323/224 |
| 2012/0235788 A1 * | 9/2012 | Lakirovich et al. | | 340/5.64 |

FOREIGN PATENT DOCUMENTS

TW 201220660 * 5/2012 ............ H02M 3/159

* cited by examiner

*Primary Examiner* — Rexford Barnie
*Assistant Examiner* — Angela Brooks
(74) *Attorney, Agent, or Firm* — McClure, Qualey & Rodack, LLP

(57) ABSTRACT

The present invention provides a power converter. The power converter includes a transformer, a power switch and a controller. The transformer has a primary winding, a secondary winding and an auxiliary winding. The power switch is coupled to the primary winding of the transformer to regulate the power converter. The controller has an output terminal for generating a driving signal to switch the power switch in response to a switching signal. A thermal resistor is coupled to the output terminal of the controller. The driving signal is adjusted across the thermal resistor during an off-period of the switching signal.

10 Claims, 7 Drawing Sheets

METHOD AND APPARATUS OF PROVIDING OVER-TEMPERATURE PROTECTION FOR POWER CONVERTERS

BACKGROUND OF THE INVENTION

1. Field of the Invention

The present invention generally relates to PWM (Pulse Width Modulation) controllers, and, more specifically, the present invention relates to a PWM controller having over-temperature protection for power converters.

2. Description of the Related Art

FIG. 1 shows a conventional power converter utilizing a controller 60 having over-temperature protection. The power converter comprises a transformer 10, a power transistor 20, a resistor 25, the controller 60, a thermal resistor 36, rectifiers 11 and 21, capacitors 12 and 22, and a secondary feedback circuit 16. The controller 60 has a supply terminal VCC, an output terminal GATE, a sense terminal CS, a feedback terminal FB, a temperature detection terminal RT, and a ground terminal GND. The transformer 10 comprises a primary winding $N_P$, an auxiliary winding $N_A$, and a secondary winding $N_S$. The auxiliary winding $N_A$ charges the capacitor 22 via the rectifier 21 to generate a supply voltage $V_{CC}$ for powering the controller 60. The secondary winding $N_S$ generates an output voltage $V_O$ of the power converter across the capacitor 12 via the rectifier 11. The secondary feedback circuit 16 comprises a resistor 13, a zenor diode 14, and an opto-coupler 15. The resistor 13 is connected between an output of the power converter and a cathode of the zenor diode 14. An input of the opto-coupler 15 is connected to an anode of the zenor diode 14. The secondary feedback circuit 16 receives the output voltage $V_o$ at the output of the power converter to generate a feedback signal $V_{FB}$. The resistor 25 is connected between a source of the power transistor 20 and a ground reference. As the power transistor 20 is turned on by the output terminal GATE of the controller 60, the resistor 25 will convert a switching current $I_P$ flowing through the power transistor 20 into a sense voltage $V_{CS}$.

The controller 60 comprises an over-temperature protection circuit, an over-current protection circuit, a regulating circuit, and a PWM (Pulse Width Modulation) circuit 30. The over-temperature protection circuit comprises a current source 34, a comparator 33, and a delay circuit 35. The current source 34 is connected to the temperature detection terminal RT of the controller 60 and a negative terminal of the comparator 33. The thermal resistor 36 is connected between the temperature detection terminal RT of the controller 60 and the ground reference. A positive terminal of the comparator 33 is supplied with a threshold voltage $V_T$. An output of the comparator 33 generates an over-temperature signal $S_{OT}$ via the delay circuit 35. The over-current protection circuit comprises a comparator 31 having a positive terminal supplied with a limit voltage $V_{LMT}$ and a negative terminal supplied with the sense voltage $V_{CS}$. An output of the comparator 31 generates an over-current signal $S_{OC}$. The regulating circuit comprises a comparator 32 and a resistor 37. A positive terminal of the comparator 32 receives the feedback signal $V_{FB}$ and is pulled high via the resistor 37. A negative terminal of the comparator 32 receives the sense voltage $V_{CS}$. An output of the comparator 32 generates a regulating signal $S_{RG}$. The PWM circuit 30 receives the over-current signal $S_{OC}$, the regulating signal $S_{RG}$ and the over-temperature signal $S_{OT}$ to generate a driving signal $V_G$ at the output terminal GATE of the controller 60.

FIG. 2 shows an example of the PWM circuit 30 of the controller 60. The PWM circuit 30 comprises an oscillator 301, an inverter 302, a flip-flop 303, an AND gate 304, NAND gates 305 and 306, a blanking circuit 307, and a buffer 308. An input of the inverter 302 receives an oscillation signal PLS generated by the oscillator 301. An output of the inverter 302 is connected to a clock-input ck of the flip-flop 303 to enable the flip-flop 303. The output of the inverter 302 is also connected to a first input of the AND gate 304. An input D of the flip-flop 303 is supplied with the over-temperature signal $S_{OT}$. An output Q of the flip-flop 303 is connected to a second input of the AND gate 304. An output of the AND gate 304 generates a switching signal $S_{PWM}$. The over-current signal $S_{OC}$ and the regulating signal $S_{RG}$ are supplied to inputs of the NAND gate 305. An output of the NAND gate 305 is connected to a first input of the NAND gate 306. The blanking circuit 307 is connected between the output of the AND gate 304 and a second input of the NAND gate 306. An output of the NAND gate 306 is coupled to a reset-input R of the flip-flop 303 to reset the flip-flop 303. The buffer 308 receives the switching signal $S_{PWM}$ for generating the driving signal $V_G$.

To achieve over-temperature protection in conventional controllers, an independent pin is needed. As a result, there is a need to reduce the pin count of the controller without scarifying original functions thereof for cost-saving concerns.

BRIEF SUMMARY OF THE INVENTION

The present invention provides a controller for a power converter. The controller comprises a switching circuit, a driving circuit, an over-temperature protection circuit, and a signal generator. The switching circuit generates a switching signal. The driving circuit is formed by a high-side transistor and a low-side transistor to generate a driving signal. The driving signal is utilized to regulate the power converter. The over-temperature protection circuit is coupled to the driving circuit. A thermal resistor is coupled to the driving circuit. The driving signal is adjusted across the thermal resistor during an off-period of the switching signal. The signal generator is coupled to control the over-temperature protection circuit. The signal generator is further coupled to the driving circuit for driving the high-side transistor and the low-side transistor.

The over-temperature protection circuit comprises a current-source circuit and a comparator. The current-source circuit is enabled to provide a current to the thermal resistor for adjusting the driving signal across the thermal resistor in response to a first signal generated by the signal generator during the off-period of the switching signal. The comparator compares a threshold voltage with the driving signal during the off-period of the switching signal to generate an over-temperature signal. When the over-temperature signal is enabled for longer than a delay time, the driving signal will be disabled to turn off the power converter.

The signal generator comprises a saw-tooth circuit, a first comparison circuit, an enabling circuit, and a second comparison circuit. The saw-tooth circuit generates a first driving signal and a saw-tooth signal in response to the switching signal. The first driving signal is utilized to drive the high-side transistor. The first comparison circuit compares the saw-tooth signal with a first reference voltage for disabling a second driving signal. The second driving signal is enabled to drive the low-side transistor in response to a falling-edge of the first driving signal. The enabling circuit generates the first signal in response to a falling-edge of the second driving signal. The first signal is utilized to enable the over-temperature protection circuit. The second comparison circuit compares the saw-tooth signal with a second reference voltage for enabling a second signal. The second signal is utilized to disable the over-temperature protection circuit. The thermal resistor is a negative temperature coefficient resistor. A level of the driving signal decreases as an environmental temperature of the power converter increases during the off-period of the switching signal.

The controller further comprises a clamping circuit. The clamping circuit is enabled to couple to said thermal resistor for clamping a maximum magnitude of said driving signal during said off-period of said switching signal.

The present invention also provides a power converter which comprises a transformer, a power switch, and a controller. The transformer has a primary winding, a secondary winding, and an auxiliary winding. The power switch is coupled to the primary winding of the transformer to regulate the power converter. The controller has an output terminal for generating a driving signal to switch the power switch in response to a switching signal. A thermal resistor is coupled to the output terminal of the controller. The driving signal is adjusted across the thermal resistor during an off-period of the switching signal.

The controller comprises a switching circuit, an over-temperature protection circuit, and a clamping circuit. The switching circuit generates the switching signal. The over-temperature protection circuit is coupled to the thermal resistor for adjusting the driving signal across the thermal resistor during the off-period of the switching signal. The clamping circuit is enabled to couple to the thermal resistor to clamp a maximum magnitude of the driving signal during the off-period of the switching signal. The thermal resistor is a negative temperature coefficient resistor.

The present invention also provides a method of providing over-temperature protection for a power converter. The method comprises steps of: providing a switching signal; generating a driving signal to switch a power switch in response to the switching signal for regulating the power converter; generating a saw-tooth signal during an off-period of the switching signal; enabling an over-temperature protection circuit as the saw-tooth signal exceeds a first reference voltage; adjusting the driving signal in response to an environmental temperature of the power converter; comparing the driving signal with a threshold voltage to enable a delay signal for generating an over-temperature signal after a delay time; and disabling the over-temperature protection circuit as the saw-tooth signal exceeds a second reference voltage. The driving signal is adjusted under a maximum magnitude during the off-period of the switching signal. The maximum magnitude is used to avoid the power switch being turned on during the off-period of the switching signal. The over-temperature signal is used for turning off the power converter. The second reference voltage is greater than the first reference voltage.

It is an objective of the present invention is to provide over-temperature protection for power converters.

It is also an objective of the present invention to save the pin count of the controller without scarifying the original protection function for power converters.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
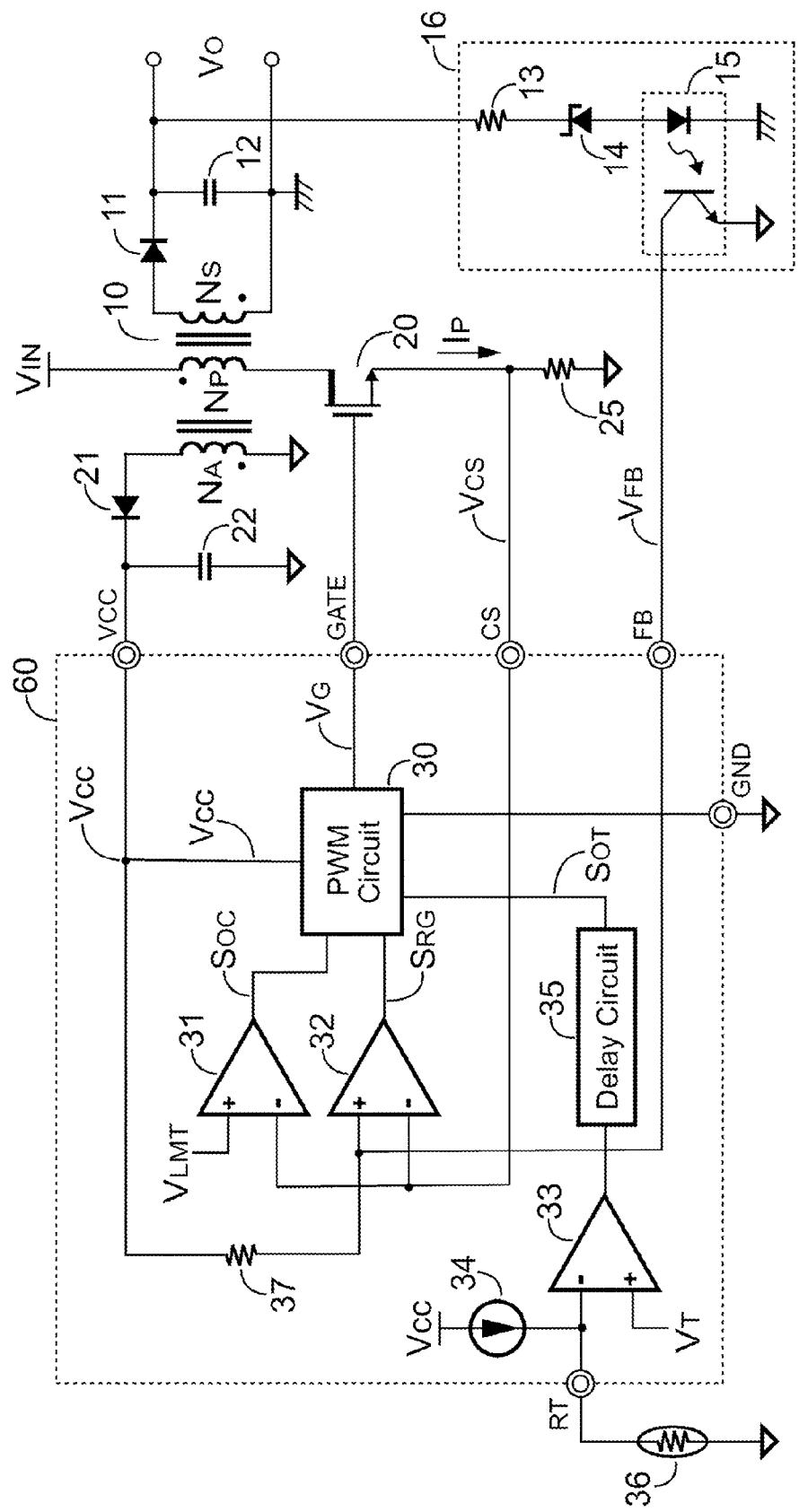
FIG. 1 shows a conventional power converter.
Figure 2:
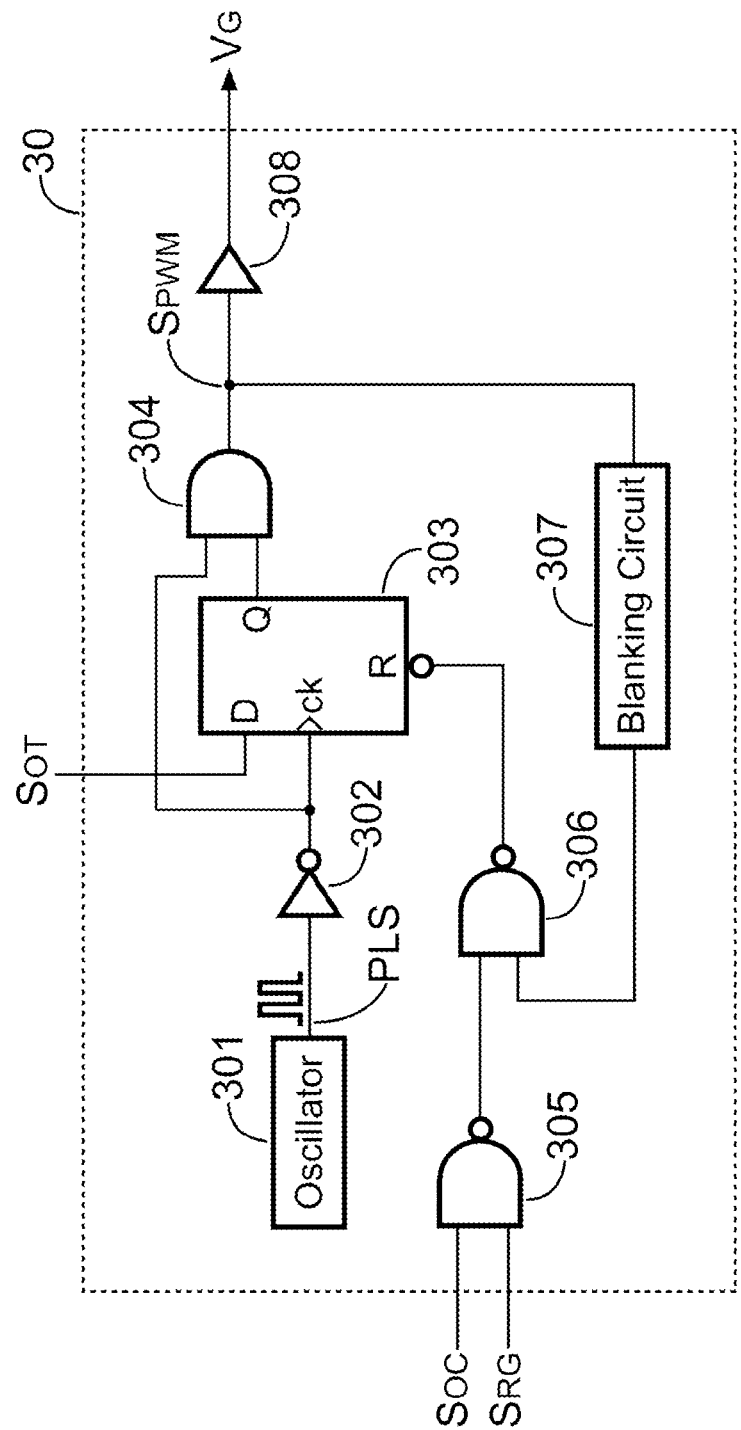
FIG. 2 shows a PWM circuit of a controller in the conventional power converter of FIG. 1.
Figure 3:
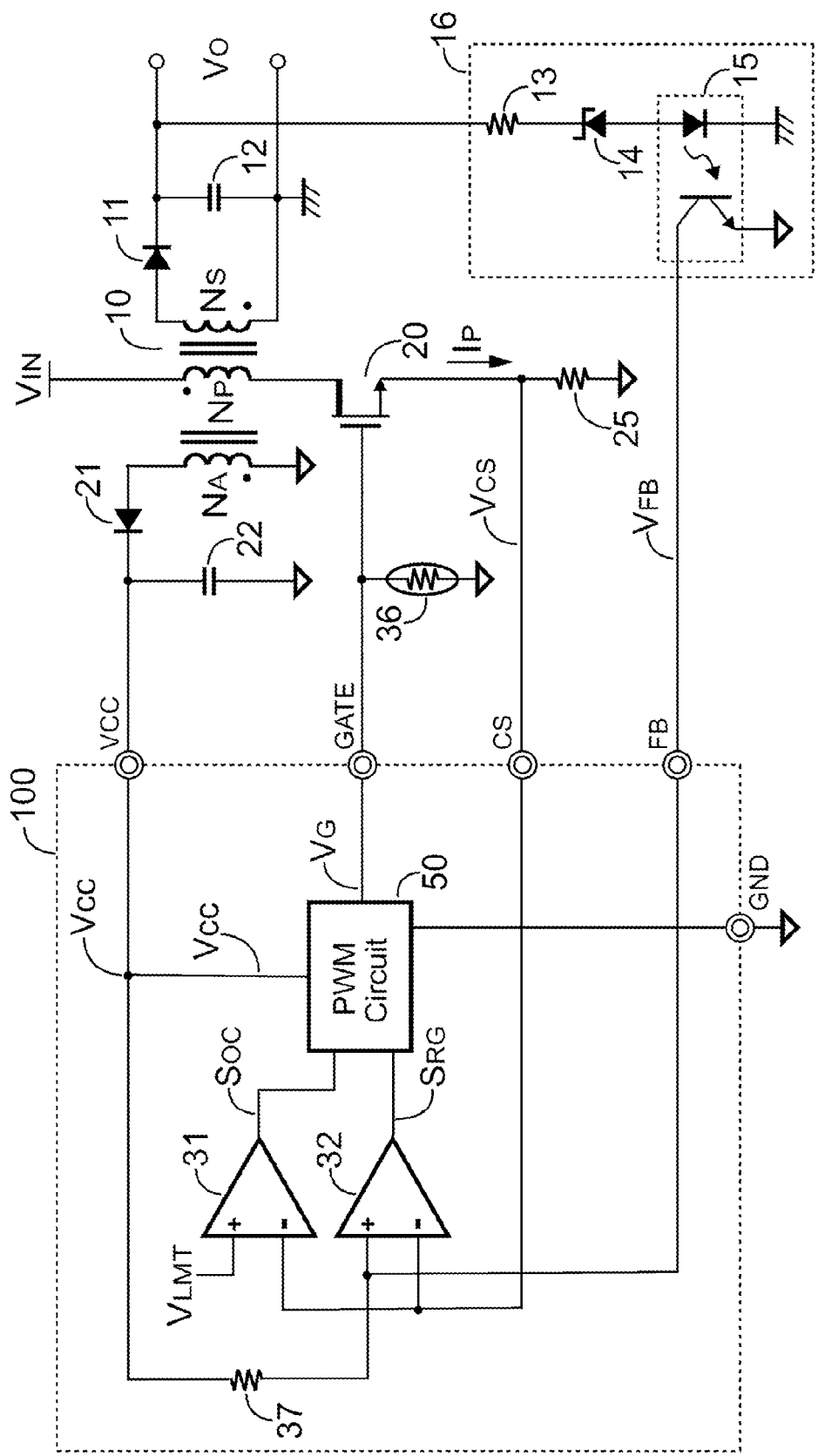
FIG. 3 shows a power converter according to the present invention.

FIG. 3 shows an embodiment of a power converter according to the present invention. The power converter comprises a transformer 10, a power transistor 20, a resistor 25, a controller 100, a thermal resistor 36, rectifiers 11 and 21, capacitors 12 and 22, and a secondary feedback circuit 16. The power transistor 20 is embodied with a power transistor in the embodiment. The controller 100 has a supply terminal VCC, an output terminal GATE, a sense terminal CS, a feedback terminal FB, and a ground terminal GND. The transformer 10 comprises a primary winding $N_P$, an auxiliary winding $N_A$, and a secondary winding $N_S$. The auxiliary winding $N_A$ charges the capacitor 22 via the rectifier 21 to generate a supply voltage $V_{CC}$ for powering the controller 100. The secondary winding $N_S$ generates an output voltage $V_O$ of the power converter across the capacitor 12 via the rectifier 11. The secondary feedback circuit 16 comprises a resistor 13, a zenor diode 14, and an opto-coupler 15. The resistor 13 is connected between an output of the power converter and a cathode of the zenor diode 14. An input of the opto-coupler 15 is connected to an anode of the zenor diode 14. The secondary feedback circuit 16 receives the output voltage $V_O$ at the output of the power converter to generate a feedback signal $V_{FB}$. The resistor 25 is connected between a source of the power transistor 20 and a ground reference. As the power transistor 20 is turned on by the output terminal GATE of the controller 100, the resistor 25 will convert a switching current $I_P$ flowing through the power transistor 20 into a sense voltage $V_{CS}$.

The controller 100 comprises an over-current protection circuit, a regulating circuit, and a PWM circuit 50. The thermal resistor 36, which has negative temperature coefficient characteristic, is connected to the output terminal GATE of the controller 100. When the environmental temperature goes high, the resistance of the thermal resistor 36 will go low, and vice versa. The over-current protection circuit comprises a comparator 31 having a positive terminal supplied with a limit voltage $V_{LMT}$ and a negative terminal supplied with the sense voltage $V_{CS}$. An output of the comparator 31 generates an over-current signal $S_{OC}$. The regulating circuit comprises a comparator 32 and a resistor 37. A positive terminal of the comparator 32 receives the feedback voltage $V_{FB}$ and is pulled high via the resistor 37. A negative terminal of the comparator 32 receives the sense voltage $V_{CS}$. An output of the comparator 32 generates a regulating signal $S_{RG}$. The over-current signal $S_{OC}$ and the regulating signal $S_{RG}$ are supplied to the PWM circuit 50 for generating a driving signal $V_G$.

Figure 4:
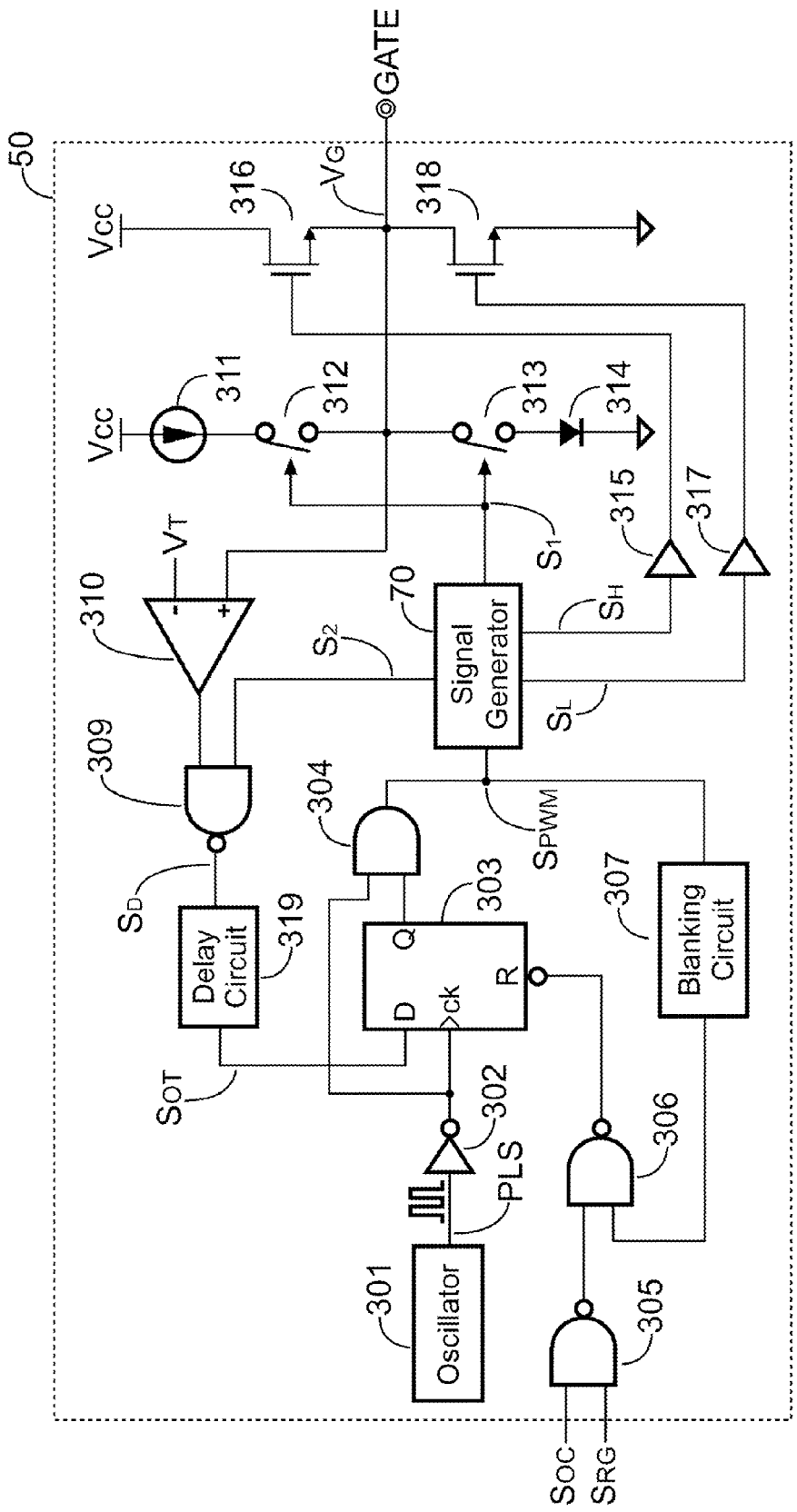
FIG. 4 shows an embodiment of a PWM circuit of a controller according to the present invention.

FIG. 4 shows an embodiment of the PWM circuit 50 of the controller 100 according to the present invention. The PWM circuit 50 comprises a switching circuit, an over-temperature protection circuit, a clamping circuit, a signal generator 70, and a driving circuit. The switching circuit comprises an oscillator 301, an inverter 302, a flip-flop 303, an AND gate 304, NAND gates 305 and 306, and a blanking circuit 307. The over-temperature protection circuit comprises a current source 311, a switch 312, a comparator 310, a NAND gate 309, and a delay circuit 319, wherein the current source 311 and the switch 312 form a current-source circuit. The driving circuit comprises buffers 315 and 317 and transistors 316 and 318. The clamping circuit, in one embodiment of the present invention, is embodied with a switch 313 and a diode 314.

The oscillator 301 generates an oscillation signal PLS. The oscillation signal PLS is supplied to a clock-input ck of the flip-flop 303 and a first input of the AND gate 304 via the inverter 302. An output Q of the flip-flop 303 is connected to a second input of the AND gate 304. The over-current signal $S_{OC}$ and the regulating signal $S_{RG}$ are supplied to inputs of the NAND gate 305. An output of the NAND gate 305 is connected to a first input of the NAND gate 306. An output of the AND gate 304 generates a switching signal $S_{PWM}$. A second input of the NAND gate 306 receives the switching signal $S_{PWM}$ via the blanking circuit 307. An output of the NAND gate 306 is coupled to a reset-input R of the flip-flop 303 to reset the flip-flop 303.

The switching signal $S_{PWM}$ is supplied to the signal generator 70 for generates a first driving signal $S_H$, a second driving signal $S_L$, a first signal $S_1$, and a second signal $S_2$. A first terminal of the current source 311 is connected to the supply voltage $V_{CC}$. The switch 312 and the switch 313 are connected in series between a second terminal of the current source 311 and an anode of the diode 314. A cathode of the diode 314 is connected to the ground reference. Both of the switches 312 and 313 are controlled by the first signal $S_1$. The transistor 316 and the transistor 318 are connected in series between the supply voltage $V_{CC}$ and the ground reference, wherein the transistor 316 coupled to the supply voltage $V_{CC}$ is referred to as a high-side transistor, while the transistor 318 coupled to the ground reference is referred to as a low-side transistor. The transistor 316 is controlled by the first driving signal $S_H$ via the buffer 315. The transistor 318 is controlled by the second driving signal $S_L$ via the buffer 317. A joint of the transistors 316 and 318 is connected to the output terminal GATE of the controller 100 for generating a driving signal $V_G$. A joint of the switches 312 and 313 is also connected to the output terminal GATE of the controller 100. The output terminal GATE of the controller 100 is connected to a positive terminal of the comparator 310. A negative terminal of the comparator 310 is supplied with a threshold voltage $V_T$. An output terminal of the comparator 310 is connected to a first input of the NAND gate 309. A second input of the NAND gate 309 is supplied with the second signal $S_2$. An output of the NAND gate 309 provides a delay signal $S_D$ to an input of the delay circuit 319.

Figure 5:
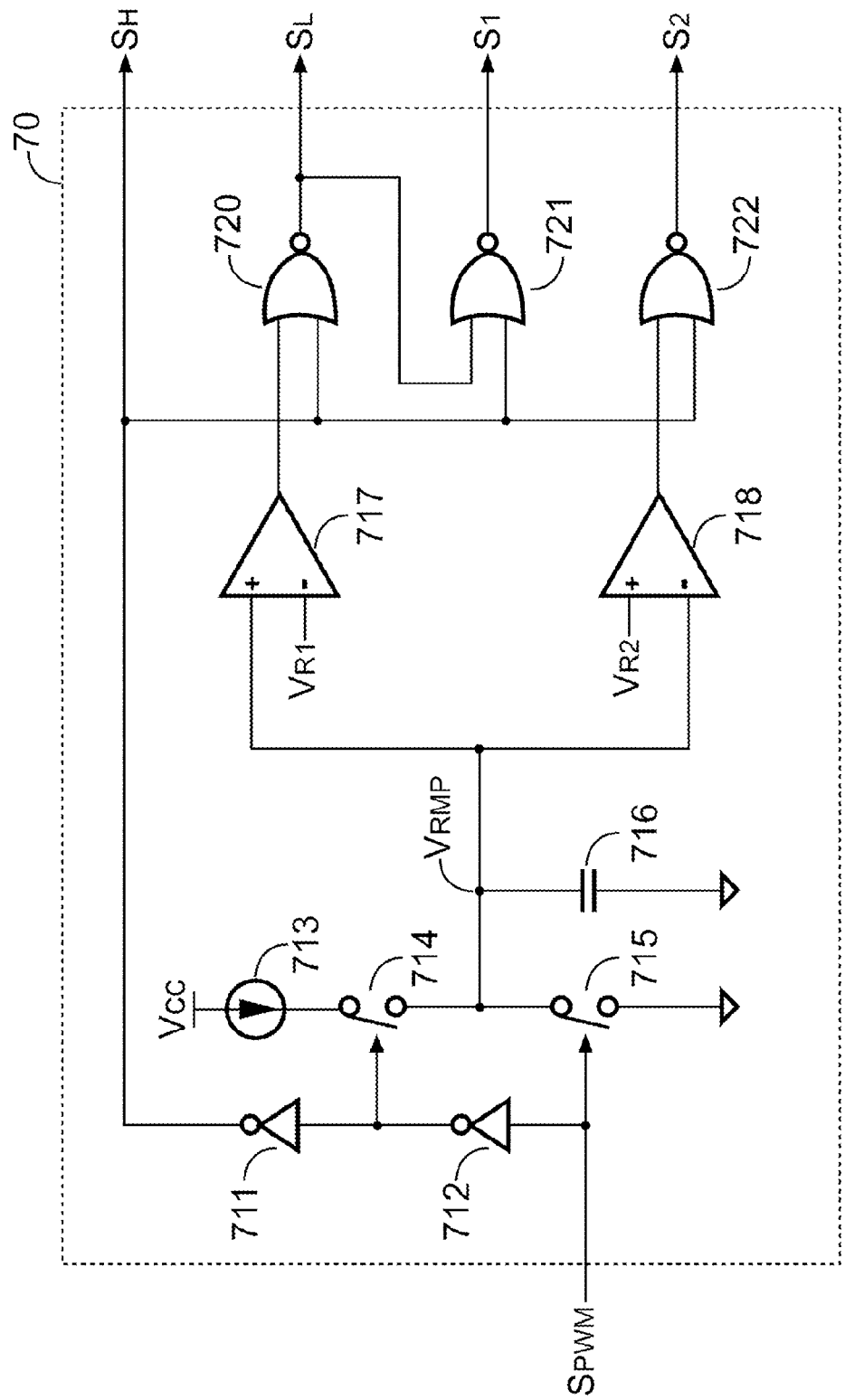
FIG. 5 shows an embodiment of a signal generator of the controller according to the present invention.

FIG. 5 shows an embodiment of the signal generator 70 of the controller 100 according to the present invention. The signal generator 70 comprises a saw-tooth circuit, a first comparison circuit, a second comparison circuit, and an enabling circuit. The saw-tooth circuit comprises inverters 711 and 712, a current source 713, switches 714 and 715, and a capacitor 716. The first comparison circuit comprises a comparator 717 and a NOR gate 720. The second comparison circuit comprises a comparator 718 and a NOR gate 722. The enabling circuit, in an embodiment of the present invention, is embodied with a NOR gate 721. A first terminal of the current source 713 is connected to the supply voltage $V_{CC}$. The switch 714 and the switch 715 are connected in series between a second terminal of the current source 713 and the ground reference. The switch 715 is controlled by the switching signal $S_{PWM}$. An input of the inverter 712 receives the switching signal $S_{PWM}$. An output of the inverter 712 is connected to an input of the inverter 711.

An output of the inverter 711 generates first driving signal $S_H$. The switch 714 is controlled by the switching signal $S_{PWM}$ via the inverter 712. The capacitor 716 is connected in parallel with the switch 715. A ramp voltage $V_{RMP}$ is obtained across the capacitor 716. The ramp voltage $V_{RMP}$ is supplied to a positive terminal of the comparator 717 and a negative terminal of the comparator 718. A negative terminal of the comparator 717 and a positive terminal of the comparator 718 are respectively supplied with a first reference voltage $V_{R2}$ and a second reference voltage $V_{R2}$. First inputs of the NOR gates 720, 721, and 722 are supplied with the first driving signal $S_H$. A second input of the NOR gate 720 is connected to an output of the comparator 717. A second input of the NOR gate 722 is connected to an output of the comparator 718. An output of the NOR gate 720 generates the second driving signal $S_L$. The second driving signal $S_L$ is supplied to a second input of the NOR gate 721. An output of the NOR gate 721 and an output of the NOR gate 722 respectively generate the first signal $S_1$ and the second signal $S_2$.

Figure 6:
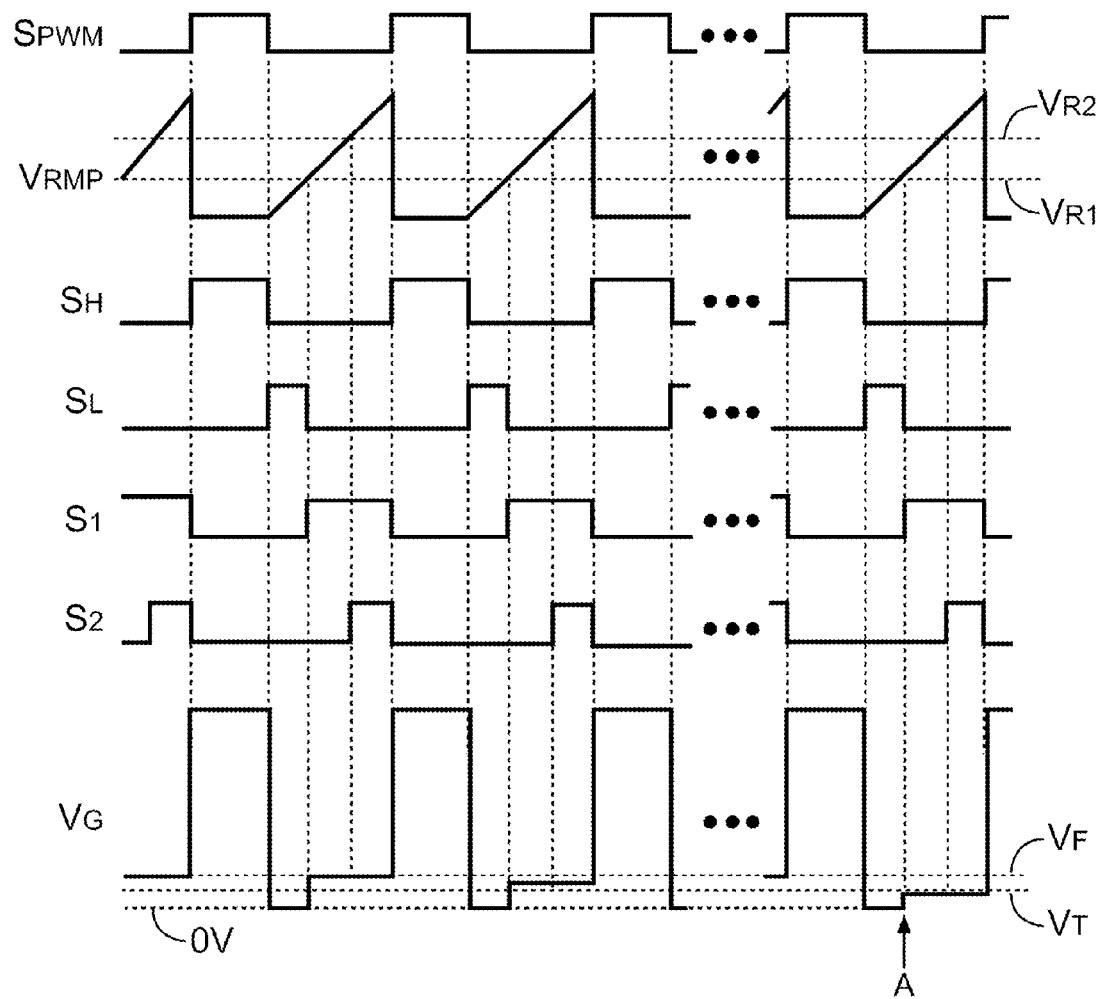
FIG. 6 shows various waveforms of the controller according to the present invention.

FIG. 6 shows various waveforms of the controller 100 according to the present invention. Further referring to FIG. 5, as the switching signal $S_{PWM}$ is disabled, the switch 714 will be turned on, and the switch 715 will be turned off The current source 713 will charge the capacitor 716 via the switch 714 to generate the ramp voltage $V_{RMP}$ across the capacitor 716. Referring to FIG. 6, the ramp voltage $V_{RMP}$ acts a saw-tooth signal. Once the switching signal $S_{PWM}$ is disabled, the first driving signal $S_H$ will be disabled. The second driving signal $S_L$ will be enabled in response to a falling-edge of the first driving signal $S_H$. Also referring to FIG. 4, the transistor 318 is turned on by the second driving signal $S_L$ via the buffer 317. The driving signal $V_G$ will be pulled down to a level of the ground reference (such as 0V) in response thereto. Once the ramp voltage $V_{RMP}$ continues to increase and exceeds a level of the first reference voltage $V_{R1}$, the second driving signal $S_L$ will be disabled. The first signal $S_1$ will be enabled in response to a falling-edge of the second driving signal $S_L$. This will turn off the transistor 318 and turn on the switches 312 and 313.

Referring to FIG. 3, the thermal resistor 36 is connected between the output terminal GATE of the controller 100 and the ground reference. As the switches 312 and 313 are turned on by the first signal $S_1$, a series connected parasitic resistor of the diode 314 (not shown) will be connected in parallel with the thermal resistor 36 via the output terminal GATE of the controller 100. Since the resistance of the parasitic resistor of the diode 314 is relatively lower than that of the thermal resistor 36, most current provided by the current source 311 will flow to the diode 314. In the meantime, the level of the driving signal $V_G$ will then be pulled up to a level of a forward voltage $V_F$ of the diode 314. The forward voltage $V_F$ of the diode 314 ensures a maximum magnitude of the driving signal $V_G$ to avoid the power transistor 20 being turned on during the off-period of the switching signal $S_{PWM}$. The threshold voltage $V_T$ supplied to the negative terminal of the comparator 310 defines an over-temperature condition, and the threshold voltage $V_T$ is lower than the forward voltage $V_F$ of the diode 314. Since the thermal resistor 36 has negative temperature coefficient characteristic, a voltage level across the thermal resistor 36, which is also equal to the level of the driving signal $V_G$, will decrease as the environmental temperature increases. As the level of the driving signal $V_G$ becomes lower than the forward voltage $V_F$ of the diode 314, most current provided by the current source 311 will flow to the thermal resistor 36. As the level of the driving signal $V_G$ continuously decreases in response to the increase of the environmental temperature and becomes lower than the threshold voltage $V_T$ (for example, at the time point indicated by "A" in FIG. 6), the comparator 310 will enable the delay signal $S_D$ via the NAND gate 309. Once the delay signal $S_D$ is enabled for longer than a delay time provided by the delay circuit 319, the delay circuit 319 will generate a logic-low over-temperature signal $S_{OT}$ to an input D of the flip-flop 303 for disabling the switching signal $S_{PWM}$, which will further disable the driving signal $V_G$ to cut off the energy transferring and protect the power converter from damages caused by over-temperature conditions.

Once the ramp voltage $V_{RMP}$ continues to increase and exceeds a level of the second reference voltage $V_{R2}$, the second signal $S_2$ will be enabled. The enabled second signal $S_2$ will disable the delay signal $S_D$ via the NAND gate 309. As long as the second input of the NAND gate 309 is supplied with a disabled second signal $S_2$ the over-temperature protection circuit will be disabled. As a result, the over-temperature protection circuit is enabled by the first signal $S_1$ and is disabled by the second signal $S_2$.

Figure 7:
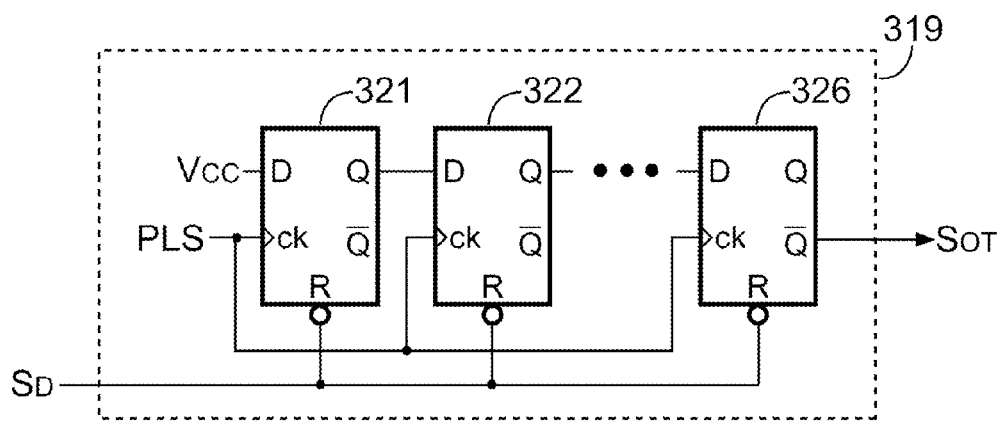
FIG. 7 shows a delay circuit of the PWM circuit according to the present invention.

FIG. 7 shows the delay circuit 319 of the PWM circuit 50 according to the present invention. The delay circuit 319 operates substantially as a counter comprising cascaded flip-flops 321, 322, and 326. The clock-inputs ck of these cascaded flip-flops are supplied with the oscillation signal PLS. Reset-inputs R of these cascaded flip-flops are supplied with the delay signal $S_D$. As the delay signal $S_D$ is enabled, the oscillation signal PLS will drive these flip-flops to generate the delay time. In one embodiment of the present invention, the switching period is 10 μs and the delay time is 10 ms. After the delay time, an inverse output $\overline{Q}$ of the flip-flop 326 will generate a logic-low over-temperature signal $S_{OT}$. As the delay signal $S_D$ is disabled, these flip-flops will be reset, and the over-temperature signal $S_{OT}$ will become logic-high again.

Figure 8:
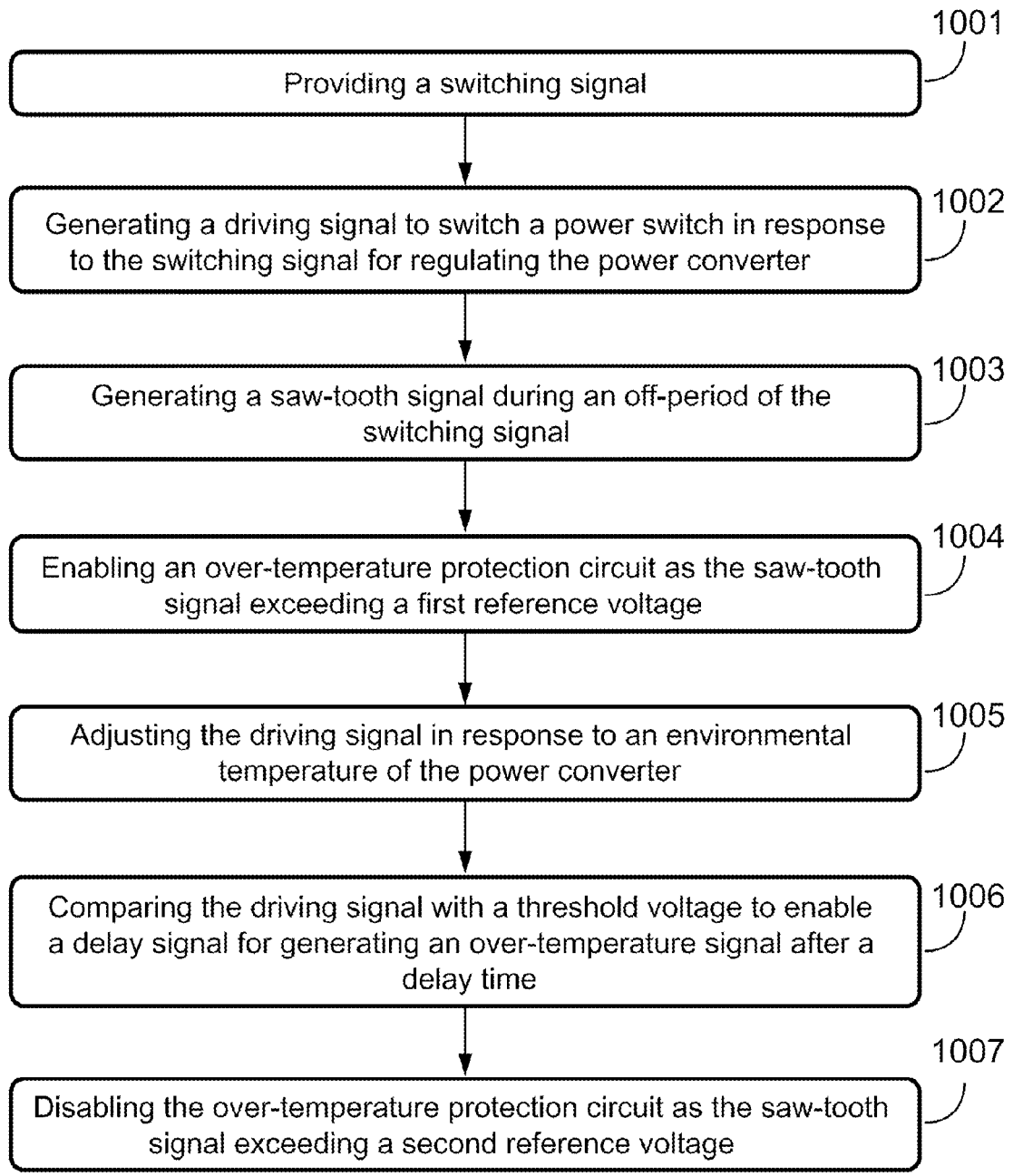
FIG. 8 shows a method of providing over-temperature protection for the power converter according to the present invention.

FIG. 8 shows a method of providing over-temperature protection for a power converter according to the present invention. Firstly, a switching signal is provided (Step 1001). Next, a driving signal is generated to switch a power switch in response to the switching signal for regulating the power converter (Step 1002). Next, a saw-tooth signal is generated during an off-period of the switching signal (Step 1003). Next, an over-temperature protection circuit is enabled as the saw-tooth signal exceeding a first reference voltage (Step 1004). Next, the driving signal is adjusted in response to an environmental temperature of the power converter (Step 1005). Next, the driving signal is compared with a threshold voltage to enable a delay signal for generating an over-temperature signal after a delay time (Step 1006). Last, the over-temperature protection circuit is disabled as the saw-tooth signal exceeding a second reference voltage (Step 1007). The driving signal is adjusted under a maximum magnitude during the off-period of the switching signal. The over-temperature signal is used for turning off the power converter. The maximum magnitude is used to avoid the power switch being turned on during the off-period of the switching signal. The second reference voltage is greater than the first reference voltage.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller for a power converter, comprising:
    a switching circuit generating a switching signal;
    a driving circuit formed by a high-side transistor and a low-side transistor to generate a driving signal, wherein said driving signal is utilized to regulate said power converter;
    an over-temperature protection circuit coupled to said driving circuit, wherein a thermal resistor is coupled to said driving circuit, and said driving signal is adjusted across said thermal resistor during an off-period of said switching signal; and
    a signal generator coupled to control said over-temperature protection circuit,
    wherein said signal generator is further coupled to said driving circuit for driving said high-side transistor and said low-side transistor.

2. The controller as claimed in claim 1, wherein said over-temperature protection circuit comprises:
    a current-source circuit enabled to provide a current to said thermal resistor for adjusting said driving signal across said thermal resistor in response to a first signal generated by said signal generator during said off-period of said switching signal; and
    a comparator comparing a threshold voltage with said driving signal during said off-period of said switching signal to generate an over-temperature signal, wherein when said over-temperature signal is enabled for longer than a delay time, said driving signal will be disabled to turn off said power converter.

3. The controller as claimed in claim 2, wherein said signal generator comprises:
    a saw-tooth circuit, generating a first driving signal and a saw-tooth signal in response to said switching signal, wherein said first driving signal is utilized to drive said high-side transistor;
    a first comparison circuit, comparing said saw-tooth signal with a first reference voltage for disabling a second driving signal, wherein said second driving signal is enabled to drive said low-side transistor in response to a falling-edge of said first driving signal;
    an enabling circuit, generating said first signal in response to a falling-edge of said second driving signal, wherein said first signal is utilized to enable said over-temperature protection circuit; and
    a second comparison circuit, comparing said saw-tooth signal with a second reference voltage for enabling a second signal, wherein said second signal is utilized to disable said over-temperature protection circuit.

4. The controller as claimed in claim 1, wherein said thermal resistor is a negative temperature coefficient resistor, and a level of said driving signal decreases as an environmental temperature of said power converter increases during said off-period of said switching signal.

5. The controller as claimed in claim 1 further comprising a clamping circuit enabled to couple to said thermal resistor for clamping a maximum magnitude of said driving signal during said off-period of said switching signal.

6. A method of providing over-temperature protection for a power converter, comprising steps of:
- providing a switching signal;
- generating a driving signal to switch a power switch in response to said switching signal for regulating said power converter;
- generating a saw-tooth signal during an off-period of said switching signal;
- enabling an over-temperature protection circuit as said saw-tooth signal exceeds a first reference voltage;
- adjusting said driving signal in response to an environmental temperature of said power converter;
- comparing said driving signal with a threshold voltage to enable a delay signal for generating an over-temperature signal after a delay time; and
- disabling said over-temperature protection circuit as said saw-tooth signal exceeds a second reference voltage.

7. The method as claimed in claim 6, wherein said driving signal is adjusted under a maximum magnitude during said off-period of said switching signal.

8. The method as claimed in claim 7, wherein said maximum magnitude is used to avoid said power switch being turned on during said off-period of said switching signal.

9. The method as claimed in claim 6, wherein said over-temperature signal is used for turning off said power converter.

10. The method as claimed in claim 6, wherein said second reference voltage is greater than said first reference voltage.

* * * * *